United States Patent
Madden et al.

(10) Patent No.: US 9,391,336 B2
(45) Date of Patent: Jul. 12, 2016

(54) MIXED-IONOMER ELECTRODE

(75) Inventors: Thomas H. Madden, Glastonbury, CT (US); Robert Mason Darling, South Windsor, CT (US); Michael L. Perry, Glastonbury, CT (US)

(73) Assignee: Audi AG, Ingolstadt (DE)

(*) Notice: Subject to any disclaimer, the term of this patent is extended or adjusted under 35 U.S.C. 154(b) by 243 days.

(21) Appl. No.: 13/818,366

(22) PCT Filed: Aug. 23, 2010

(86) PCT No.: PCT/US2010/046313
§ 371 (c)(1),
(2), (4) Date: Feb. 22, 2013

(87) PCT Pub. No.: WO2012/026916
PCT Pub. Date: Mar. 1, 2012

(65) Prior Publication Data
US 2013/0157169 A1    Jun. 20, 2013

(51) Int. Cl.
*H01M 4/94* (2006.01)
*H01M 8/10* (2016.01)
*H01M 4/86* (2006.01)
(Continued)

(52) U.S. Cl.
CPC .......... *H01M 8/1004* (2013.01); *H01M 4/8652* (2013.01); *H01M 4/8657* (2013.01); *H01M 4/881* (2013.01); *H01M 4/8828* (2013.01);
(Continued)

(58) Field of Classification Search
CPC .. H01M 8/1004; H01M 8/1039; H01M 4/881
USPC ....................................................... 429/482
See application file for complete search history.

(56) References Cited

U.S. PATENT DOCUMENTS

| | | | | |
|---|---|---|---|---|
| 5,211,984 A | * | 5/1993 | Wilson ................ | H01M 4/926 427/115 |
| 5,441,822 A | * | 8/1995 | Yamashita ............ | H01M 4/926 429/508 |

(Continued)

FOREIGN PATENT DOCUMENTS

| | | |
|---|---|---|
| JP | 2006216503 A | 8/2006 |
| JP | 2006286329 A | 10/2006 |
| JP | 2006286580 A | 10/2006 |

OTHER PUBLICATIONS

Mizuhata et al. (Journal of Power Sources 138 (2004) 25-30).*
(Continued)

*Primary Examiner* — Stewart Fraser
*Assistant Examiner* — Olatunji Godo
(74) *Attorney, Agent, or Firm* — Seed IP Law Group PLLC (57) ABSTRACT

A membrane electrode assembly includes a membrane, an anode catalyst layer and a cathode catalyst layer. The anode catalyst layer is on a first side of the membrane and the cathode catalyst layer is on a second side of the membrane, wherein the second side of the membrane is opposite the first side of the membrane along a first axis. The cathode catalyst layer includes agglomerates formed of a catalyst support supporting catalyst particles, an agglomerate ionomer and an inter-agglomerate ionomer. The agglomerate ionomer surrounds the agglomerates and the inter-agglomerate ionomer is in regions between the agglomerates surrounded by the agglomerate ionomer. The agglomerate ionomer is different than the inter-agglomerate. Methods to produce the catalyst layer are also provided.

15 Claims, 7 Drawing Sheets

(51) Int. Cl.
*H01M 4/88* (2006.01)
*H01M 4/92* (2006.01)

(52) U.S. Cl.
CPC ................ *H01M 4/92* (2013.01); *H01M 4/926* (2013.01); *H01M 8/1002* (2013.01); *Y02E 60/521* (2013.01)

(56) References Cited

U.S. PATENT DOCUMENTS

| | | | | |
|---|---|---|---|---|
| 2003/0134739 A1* | 7/2003 | Cox | ........................ | B01J 23/40 502/4 |
| 2004/0028992 A1* | 2/2004 | Jaouen | ................ | H01M 4/8857 429/494 |
| 2006/0105226 A1 | 5/2006 | Kim et al. | | |
| 2006/0110632 A1* | 5/2006 | Hong | ...................... | B01J 23/42 429/524 |
| 2006/0275648 A1* | 12/2006 | Kim | .................... | H01M 4/8657 429/483 |
| 2007/0105005 A1* | 5/2007 | Tolmachev | ........... | B22F 1/0025 429/483 |
| 2009/0023018 A1* | 1/2009 | Oh et al. | ........................ | 429/12 |
| 2010/0003571 A1* | 1/2010 | Morinaga | ........... | H01M 4/8605 429/534 |
| 2014/0051008 A1* | 2/2014 | Ramanathan et al. | ........ | 429/482 |

OTHER PUBLICATIONS

Kim et al. (J. Ind. Eng. Chem., vol. 13, No. 5, (2007) 850-855.*
Passalacqua et al. (Electrochimica Acta 46 (2001) 799-805).*
The International Search Report and Written Opinion of Counterpart International Application No. PCT/US2010/046313 filed Aug. 23, 2010.

* cited by examiner

MIXED-IONOMER ELECTRODE

BACKGROUND

A proton exchange membrane fuel cell (PEMFC) includes an anode, a cathode and a proton exchange membrane (PEM) between the anode and cathode. In one example, hydrogen gas is fed to the anode and air or pure oxygen is fed to the cathode. However, it is recognized that other types of fuels and oxidants can be used. At the anode, an anode catalyst causes the hydrogen molecules to split into protons ($H^+$) and electrons ($e^-$). The protons pass through the PEM to the cathode while the electrons travel through an external circuit to the cathode, resulting in production of electricity. At the cathode, a cathode catalyst causes the oxygen molecules to react with the protons and electrons from the anode to form water, which is removed from the system.

The anode catalyst and cathode catalyst are commonly formed of platinum supported on carbon. The platinum catalyst is only active when it is accessible to protons, electrons and the reactant (i.e., hydrogen or oxygen). Regions of the catalyst layer accessible to these three phases are referred to as the three-phase boundary. Increasing the three-phase boundary increases the performance of the fuel cell.

The performance of the PEMFC can decline during use. For example, agglomeration and dissolution of the catalyst particles during the course of cycling the fuel cell are a few causes for this decline. Therefore, reducing agglomeration and dissolution is also important for increasing the performance of the fuel cell.

Additionally, platinum and other suitable noble metal catalysts are expensive. In order to reduce costs, it is desirable to use low platinum loading electrodes. Low platinum loadings, however, result in high power performance losses that exceed that predicted for kinetic activation losses alone. High performing low platinum loading electrodes cannot be formed by simply reducing the platinum loading of an electrode.

SUMMARY

A membrane electrode assembly includes a membrane, an anode catalyst layer and a cathode catalyst layer. The anode catalyst layer is on a first side of the membrane and the cathode catalyst layer is on a second side of the membrane, wherein the second side of the membrane is opposite the first side of the membrane along a first axis. The cathode catalyst layer includes agglomerates formed of a catalyst support supporting catalyst particles, an agglomerate ionomer and an inter-agglomerate ionomer. The agglomerate ionomer surrounds the agglomerates and the inter-agglomerate ionomer is in regions between the agglomerates surrounded by the agglomerate ionomer. The agglomerate ionomer is different than the inter-agglomerate ionomer. Methods to produce the catalyst layer are also provided.

BRIEF DESCRIPTION OF THE DRAWINGS

FIG. 1b is an enlarged view of a mixed-ionomer cathode catalyst layer of the fuel cell repeat unit of FIG. 1a.

DETAILED DESCRIPTION

Fuel cells convert chemical energy to electrical energy using one or more fuel cell repeat units. The fuel cell repeat unit described herein includes a mixed-ionomer catalyst layer. The mixed-ionomer catalyst layer includes an agglomerate ionomer surrounding agglomerates and an inter-agglomerate ionomer between the agglomerates surrounded by the agglomerate ionomer. The mixed-ionomer catalyst layer can be formed of one or more discrete coatings or layers. The agglomerate ionomer and the inter-agglomerate ionomer of a discrete catalyst layer are different. The mixed-ionomer catalyst layer enables the catalyst layer to be further tailored to address the unique sources of overpotential for a low catalyst loading electrode. A method of forming the mixed-ionomer catalyst layer is also described.

Figure 1A:
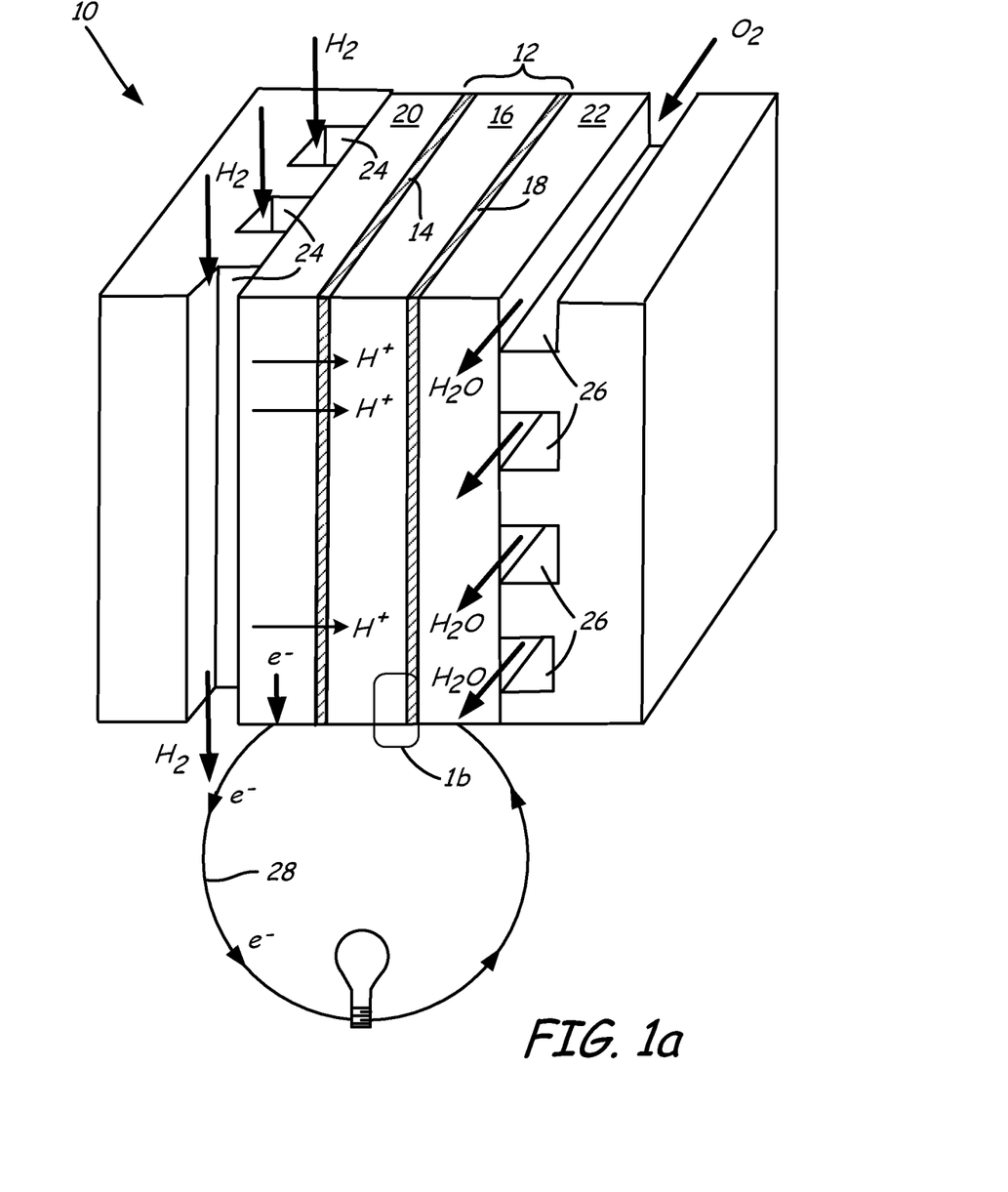
FIG. 1a is a perspective view of a fuel cell repeat unit.

FIG. 1a illustrates a perspective view of one example fuel cell repeat unit 10, which includes membrane electrode assembly (MEA) 12 (having anode catalyst layer (CL) 14, membrane 16 and cathode catalyst layer (CL) 18), anode gas diffusion layer (GDL) 20, cathode gas diffusion layer (GDL) 22, anode flow field 24 and cathode flow field 26. Fuel cell repeat unit 10 can have coolant flow fields adjacent to anode flow field 24 and cathode flow field 26. Coolant flow fields are not illustrated in FIG. 1a.

Anode GDL 20 faces anode flow field 24 and cathode GDL 22 faces cathode flow field 26. Anode CL 14 is positioned between anode GDL 20, and membrane 16 and cathode CL 18 is positioned between cathode GDL 22 and membrane 16. In one example, fuel cell repeat unit 10 can be a polymer electrolyte membrane (PEM) fuel cell that uses hydrogen fuel (i.e., hydrogen gas) and oxygen oxidant (i.e., oxygen gas or air). It is recognized that fuel cell repeat unit 10 can use alternative fuels and/or oxidants.

In operation, anode GDL 20 receives hydrogen gas ($H_2$) by way of anode flow field 24. Anode CL 14, which contains a catalyst such as platinum, causes the hydrogen molecules to split into protons ($H^+$) and electrons ($e^-$). The protons and electrons travel to cathode CL 18; the protons pass through membrane 16 to cathode CL 18, while the electrons travel through external circuit 28, resulting in a production of electrical power. Air or pure oxygen ($O_2$) is supplied to cathode GDL 22 through cathode flow field 26. At cathode CL 18, oxygen molecules react with the protons and electrons from anode CL 14 to form water ($H_2O$), which then exits fuel cell 10, along with excess heat.

Membrane 16 is a semi-permeable membrane located between anode CL 14 and cathode CL 18. Membrane 16 allows movement of protons and water but does not conduct electrons. Protons and water from anode CL 14 can move through membrane 16 to cathode CL 18. Membrane 16 can be formed of an ionomer. An ionomer is a polymer with ionic properties. In one example, membrane 16 is formed of a perfluorosulfonic acid (PFSA)-containing ionomer, such as Nafion® by E.I. DuPont, USA. PFSA polymers are composed of fluorocarbon backbones with sulfonate groups attached to short fluorocarbon side chains.

In another example, membrane 16 is formed of a hydrocarbon ionomer. In general, the main chains of hydrocarbon ionomers do not contain large amounts of fluorine, unlike PFSA ionomers which have highly fluorinated backbones. A hydrocarbon ionomer is an ionomer having a main chain which contains hydrogen and carbon, and which may also contain a small mole fraction of hetero atoms such as oxygen, nitrogen, sulfur, and/or phosphorus. These hydrocarbon ionomers primarily include aromatic and aliphatic ionomers. Examples of suitable aromatic ionomers include but are not limited to sulfonated polyimides, sulfoalkylated polysulfones, poly(β-phenylene) substituted with sulfophenoxy benzyl groups, and polybenzimidazole ionomers. Non-limiting examples of suitable aliphatic ionomers are those based upon vinyl polymers, such as cross-linked poly(styrene sulfonic acid), poly(acrylic acid), poly(vinylsulfonic acid), poly(2-acrylamide-2-methylpropanesulfonic acid) and their copolymers.

The composition of membrane 16 affects the operating temperature of fuel cell repeat unit 10. For example, hydrocarbon ionomers typically have a higher glass transition temperature than PFSA ionomers, which enables a hydrocarbon ionomer membrane 16 to be operated at a higher temperature than a PFSA ionomer membrane 16.

Cathode CL 18 is adjacent to the cathode side of membrane 16. Cathode CL 18 is a mixed-ionomer structure that includes two or more ionomers and a catalyst, as described further below. The catalyst of cathode CL 18 promotes electrochemical reduction of oxidant (i.e., oxygen). In one example, the catalyst is platinum. Cathode CL 18 can have a low platinum loading, such as less than about 0.4 milligrams platinum per square centimeter of cathode CL 18. Low platinum loading reduces the fuel cell costs. However, it has been observed that prior low platinum loading electrodes experienced higher oxygen transport losses.

Anode CL 14 is adjacent to the anode side of membrane 16, and opposite cathode CL 18. Anode CL 14 includes one or more ionomers and a catalyst. The catalyst of anode CL 14 promotes electrochemical oxidation of fuel (i.e., hydrogen). Anode CL 14 can have a structure similar to that described above for cathode CL 18, although anode CL 14 and cathode CL 18 can have different compositions. Alternatively, anode CL 14 can be formed of one ionomer and a catalyst.

Fuel cell repeat unit 10 is formed by creating MEA 12 having anode CL 14 and cathode CL 18 on either side of membrane 16. Then, MEA 12 is combined with anode GDL 20 and cathode GDL 22 which have not been coated with catalyst. A fuel cell can contain a plurality of fuel cell repeat units 10 to generate the required electricity. Note that an alternate configuration that is used less commonly involves GDL's 20 and 22 coated with CL which are then combined with membrane 16. The repeat unit configuration is identical to above, and this invention is meant to embody either means of assembling this structure.

MEA 12 can be formed using many different techniques. In one example, MEA 12 can be formed by a decal transfer process in which anode CL 14 and cathode CL 18 are formed on substrates and transferred onto membrane 16 by hot pressing. Example substrates suitable for a decal transfer process include Teflon® substrates by E.I. DuPont, USA, and Teflon® derivative substrates. In another example, MEA 12 can be formed by directly applying catalyst ink onto membrane 16 to form anode CL 14 and cathode CL 18.

Fuel cell performance losses prevent a fuel cell from operating at its theoretical efficiency. As discussed above, low catalyst loading electrodes generally have performance losses that are higher than those predicted based on kinetic activation losses alone. This suggests that at least one source of overpotential other than kinetics increases with decreasing catalyst loading. For example, it has been found that oxygen transfer losses are greater in low catalyst loading electrodes, while ohmic losses are lower in thin, low catalyst loading electrodes. More specifically, it has been found that oxygen gain rises due to relative humidity decreases and transport losses are greater for low catalyst loading electrodes. The oxygen gain is defined as the difference in performance measured on oxygen and air on the cathode and an increase in the oxygen gain usually results from higher oxygen transport losses.

Typically, in a hydrogen-air fuel cell, the hydrogen oxidation reaction (HOR) occurring at anode CL 14 has a relatively lower overpotential at a given current than the oxidation reduction reaction (ORR) of cathode CL 18. Cathode CL 18 having a mixed-ionomer structure and an improved performance will be described further, although one skilled in the art will recognize that anode CL 14 can also have a mixed-ionomer structure.

Figure 1B:
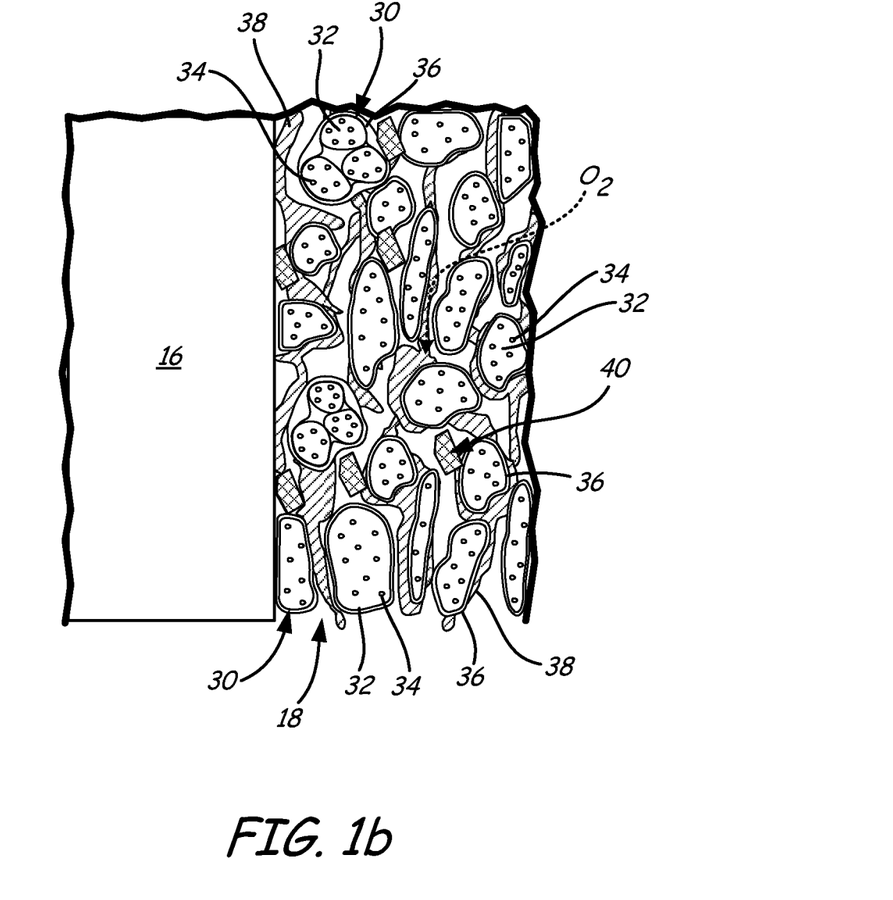

FIG. 1b is an enlarged schematic view of a portion of membrane 16 and cathode CL 18 which includes agglomerates 30 (having catalyst support 32 and catalyst particles 34), agglomerate ionomer 36, inter-agglomerate ionomer 38 and water 40. Agglomerate ionomer 36 coats the outer surface of agglomerates 30. Inter-agglomerate ionomer 38 forms a structural support system between agglomerates 30. As illustrated, cathode CL 18 has a porous structure which enables water 40 to be removed from the system and gas to move through cathode CL 18. In this example, cathode CL 18 is formed of one discrete catalyst layer.

Catalyst supports 32 support catalyst particles 34. In one example, catalyst supports 32 are formed from activated carbon or carbon black, such as Ketjen Black (KB). Catalyst supports 32 have a diameter between about 10 nanometers and about 100 nanometers.

Catalyst particles 34 are deposited on catalyst supports 32. Catalyst particles 34 promote the oxidation reduction reaction (ORR). For example, catalyst particles 34 can be a noble metal catalyst, such as ruthenium, rhodium, palladium, silver, osmium, iridium, platinum and gold and alloys thereof. To maximize the surface area of available catalyst particles 34, catalyst particles 34 can be finely dispersed on the surface of catalyst supports 32. In one example, agglomerates 30 are carbon supported platinum particles having 50 weight percent platinum and 50 weight percent carbon (corresponding to a Pt/C ratio of 1:1). The Pt/C ratio can be varied to modify the transport characteristics of the cathode CL.

Agglomerates 30 are individually covered with a film of agglomerate ionomer 36. Agglomerate ionomer 36 is a polymer with ionic properties. To maximize the activated catalyst surface area, agglomerates 30 can be formed of a single catalyst support 32 with a plurality of catalyst particles 34 supported thereon. Alternatively, agglomerates 30 can be formed of a plurality of catalyst supports 32 supporting finely dispersed catalyst particles 34. The thickness of the film of agglomerate ionomer 36 on agglomerates 30 is thin compared to the thickness of cathode CL 18. In one example, cathode CL 18 is between about 5 and about 15 microns thick. In another example, the thickness of agglomerate ionomer 36 is between about 1 and about 15 nanometers, and more specifically the thickness of agglomerate ionomer 36 is between about 2 and about 10 nanometers.

Inter-agglomerate ionomer 38 is located at inter-agglomerate regions between agglomerates 30 which are coated with agglomerate ionomer 36. Inter-agglomerate ionomer 38 supports agglomerates 30 such that agglomerates 30 are dispersed throughout cathode CL 18. Inter-agglomerate ionomer 38 creates a porous structure that enables reactant gases to permeate CL 18 and water 40 to be removed. Inter-agglomerate ionomer 38 also conducts protons. For example, inter-agglomerate ionomer 38 conducts protons from membrane 16 to catalyst particles 34.

The optimum amount of ionomer (agglomerate ionomer 36 and inter-agglomerate ionomer 38) depends on the operating conditions of the fuel cell. The weight ratio of agglomerate ionomer 36 to inter-agglomerate ionomer 38 may be not equal. In one example, the agglomerate ionomer to catalyst weight ratio can be between about 0.3 and 0.5, and the total ionomer (including agglomerate ionomer 36 and inter-agglomerate ionomer 38) to catalyst weight ratio can be between about 0.5 and 1.1. In another example, the total ionomer to catalyst weight ratio can be between about 0.6 and 0.8.

Agglomerate ionomer 36 and inter-agglomerate ionomer 38 have different equivalent weights (EW) and/or compositions. EW is the ionomer molecular weight that contains 1 mol of ionic groups and indicates the ionic content of the ionomer. More specifically, a low EW ionomer has a high ionic content relative to a high EW ionomer, and is therefore more conductive. In cathode CL 18, agglomerate ionomer 36 and inter-agglomerate ionomer 38 of a discrete catalyst layer are different. For example, agglomerate ionomer 36 and inter-agglomerate ionomer 38 can have different compositions or EWs.

The optimum ionomer composition in cathode CL 18 can vary with position, either through thickness or over active area. In one example, inter-agglomerate ionomer 38 defines the macroscopic ionomer structure while agglomerate ionomer 36 defines the microscopic ionomer structure. This enables tailoring of both the macroscopic (e.g., micron-scale) and microscopic (e.g., nanometer-scale) ionomer structures.

In a specific example, inter-agglomerate ionomer 38 is a hydrocarbon ionomer and agglomerate ionomer 36 is a perfluorosulfonic acid (PFSA) ionomer. An example of a PFSA is Nafion™ from E.I. DuPont, which has a PTFE backbone and a short fluorocarbon-based side chain, whereas the backbone and side chain of a HC-based ionomer is composed of hydrocarbons instead of fluorocarbons. Mixtures of hydrocarbons and fluorocarbons in the backbone or side chains are also possible. In addition, the ionic groups can be an anion other than sulfonate (e.g., phosphate) and, more even generally, an ionomer can alternatively be an anion-exchange polymer with cations attached to the polymeric chains instead of a cation-exchange polymer with anions attached to the polymeric chains. In the latter case, an anion-exchange ionomer would be used in an anion-exchange membrane fuel cell (AEMFC).

PFSA ionomers have a high gas permeability, but also a high affinity for platinum. Thus, although oxygen can permeate easily through the PFSA ionomer to catalyst particles 34, catalyst particles 34 also dissolve and move through the PFSA ionomer as ionic species. In contrast to PFSA ionomers, hydrocarbon ionomers generally have a low gas permeability and a low solubility for platinum. By coating agglomerates 30 with PFSA agglomerate ionomer 36, reactant gases can easily penetrate PFSA agglomerate ionomer 36 to reach catalyst particles 34. Additionally, by supporting agglomerates 30 with hydrocarbon inter-agglomerate ionomer 38, platinum catalyst particles 34 do not migrate into membrane 16 through cathode CL 18. During cycling only small amounts of platinum catalyst particles 34 are lost into PFSA agglomerate ionomer 36 surrounding agglomerates 30. The low solubility of hydrocarbon inter-agglomerate ionomer 38 reduces or prevents further migration of platinum catalyst particles 34. That is, hydrocarbon inter-agglomerate ionomer 38 prevents or reduces platinum migration into the electrode or membrane 16.

Additionally, hydrocarbon ionomers are thermally and dimensionally stable ionomers so that hydrocarbon inter-agglomerate ionomer 38 functions as an effective scaffolding in porous cathode CL 18. Further, hydrocarbon inter-agglomerate ionomer 38 creates a generally fixed porosity at different hydration levels, thus mitigating performance changes due to changes in relative humidity.

As discussed above, reducing platinum loading (i.e., reducing the number of catalyst particles 34 in cathode CL 18) reduces the cost of a fuel cell. However, reducing platinum loading results in high power performance losses that exceed what would be predicted for activation loss only. Hindered oxygen diffusion through the microscopic ionomer layer may be responsible for the excess losses. The mixed-ionomer cathode CL 18 described above improves the performance of the fuel cell. Hydrocarbon inter-agglomerate ionomer 38 provides adequate proton conductivity and a more stable macroporous gas pore structure. For example, the functions of oxygen transport are defined at the gas pore length scales (about 10 to about 100 nanometers) by pores in hydrocarbon inter-agglomerate ionomer 38. Further, the relative proximity of hydrocarbon inter-agglomerate ionomer 38 to platinum catalyst particles 34 reduces the driving force for platinum mobility (i.e., dissolution/sintering). PFSA agglomerate ionomer 36 provides microscopic proton conductivity while maintain high oxygen transport.

In another example, agglomeration ionomer 36 and inter-agglomeration ionomer 38 have different EWs. For example, inter-agglomerate ionomer 38 can have a lower EW than agglomerate ionomer 36. In a specific example, inter-agglomerate ionomer 38 is a low EW ionomer, such as between about 500 and about 900 or between about 750 and about 850, and agglomerate ionomer 36 is a high EW ionomer, such as between about 900 and about 1300 or between about 1050 and about 1250. The majority of ohmic losses typically occur on the length scale of the thickness of cathode CL 18, while gas transport losses can be significant on a smaller length scale. Further, oxygen transport losses are typically the limiting process in low catalyst loading electrodes. Using low EW inter-agglomerate ionomer 38 reduces ohmic losses because a low EW ionomer has a higher ionic conductivity. In other cases, mixed-ionomer cathode CL 18 is formed of high EW inter-agglomerate ionomer 38 and low EW agglomerate ionomer 36.

Figure 2:
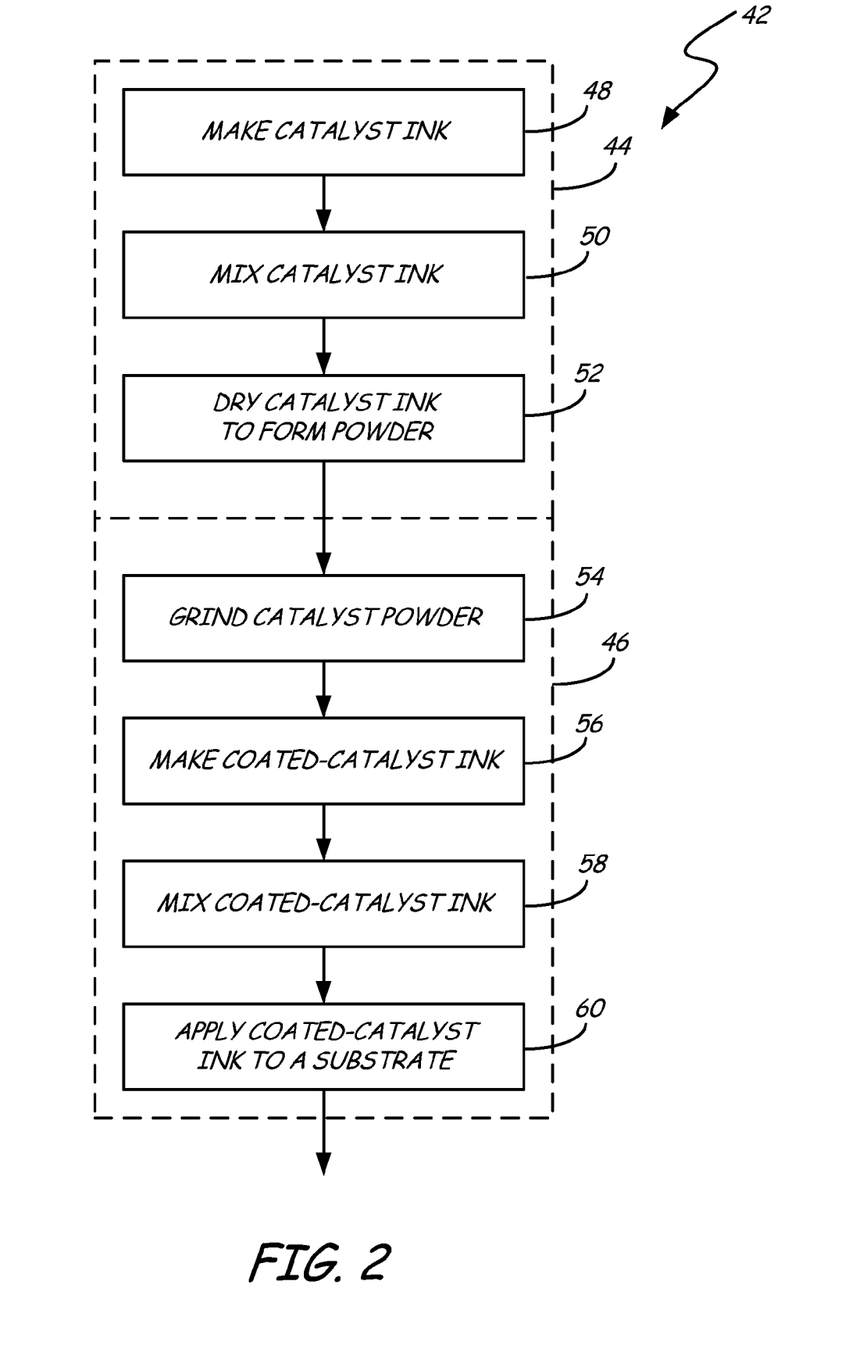
FIG. 2 illustrates a method for forming the mixed-ionomer cathode catalyst layer of FIG. 1b.

FIG. 2 is a block diagram of method 42 for forming mixed-ionomer cathode CL 18, which includes forming ionomer-coated agglomerates (process 44) and forming a catalyst layer (process 46).

First, ionomer-coated agglomerates are formed in process 44. Forming ionomer-coated agglomerates includes making a catalyst ink (step 48), mixing the catalyst ink (step 50) and drying the catalyst ink to form powder (step 52). A catalyst ink is formed in step 48 by mixing catalyst particles with an agglomerate ionomer in liquid form (i.e., ionomer dissolved or dispersed in a solvent, such as isopropyl alcohol, and water). The agglomerate ionomer can be a fluoro-carbon based ionomer, such as Nafion® by E.I. DuPont, USA. As described above, the catalyst particles can be formed of any noble metal or alloy thereof and can be supported on a carbon support structure. For example, 1:1 Pt/C catalysts can be used. The ratio of agglomerate ionomer to catalyst support and the surface area of the support in the catalyst ink controls the resulting thickness of the agglomerate ionomer film formed on the catalyst agglomerates. In one example, the agglomerate ionomer to catalyst support ratio is controlled in step 48 to form an agglomerate ionomer film between about 1 to about 15 nanometers. In another example, the agglomerate ionomer to catalyst support ratio is controlled in step 48 to form an agglomerate ionomer film between about 2 to about 10 nanometers thick.

Next, the catalyst ink is mixed using aggressive mixing procedures to form a dispersion (step 50). The mixing should be sufficient to ensure that the ionomer interacts and coats at least the surfaces of the agglomerates. For example, the catalyst ink can be mixed using ultrasonic mixing.

The catalyst ink is then dried to remove the solvent and form a catalyst powder (step 52). Drying the catalyst ink forms catalyst agglomerates 30 coated with agglomerate ionomer 36 of FIG. 1b. In one example, the catalyst ink is dried at a temperature between about 60 and about 80 degrees Celsius for between about 30 and about 60 minutes. In another example, the catalyst ink is dried at a higher temperature to anneal the agglomerate ionomer. For example, the catalyst ink can be heated to a temperature such that the agglomerate ionomer flows. In a specific example, the catalyst ink is heated at a temperature between about 100 and about 150 degrees Celsius for between about 30 and about 60 minutes. The agglomerate ionomer to catalyst ratio of the catalyst ink can be varied to adjust the thickness of the agglomerate ionomer film on the agglomerates.

Next, a catalyst layer is formed in process 46. Forming a catalyst layer includes grinding the catalyst powder (step 54), making a coated-catalyst ink (step 56), mixing the coated-catalyst ink (step 58) and applying the coated-catalyst ink to a substrate (step 60). In step 54, the catalyst powder formed in step 52 is ground. Immediately following step 52, the agglomerate ionomer coats the agglomerates and bonds the agglomerates together. The catalyst powder is ground to separate the catalyst coated agglomerates.

In step 56, a coated-catalyst ink is formed by mixing the ground catalyst powder with an inter-agglomerate ionomer in a liquid state. For example, the inter-agglomerate ionomer can be dispersed/dissolved in water and alcohol. As described above, the agglomerate ionomer and the inter-agglomerate ionomer are different. For example, the agglomerate ionomer and the inter-agglomerate ionomer can have different compositions or EWs. The coated-catalyst ink is mixed using an aggressive mixing procedure in step 58 to form a homogenous catalyst ink. For example, the coated-catalyst ink can be mixed by ultrasonic mixing. The aggressive mixing ensures that the agglomerates are coated with the agglomerate ionomer.

The coated-catalyst ink is applied to a substrate in step 60 to form a catalyst layer. In one example, the coated-catalyst ink is applied to a Teflon® substrate, dried, and transferred to the membrane by a decal transfer process. In another example, the substrate is a membrane so that the coated-catalyst ink is applied directly to the membrane, such as by a spraying process. In a third example, the substrate is a gas diffusion layer. The catalyst layer has the structure shown in FIG. 1b, wherein catalyst agglomerates 30 are surrounded by a film layer of agglomerate ionomer 36 and inter-agglomerate ionomer 38 forms a support structure to support catalyst agglomerates 30. The inter-agglomerate ionomer to catalyst powder ratio can be varied in step 56 to adjust the thickness of the catalyst layer and the ionomer to total weight ratio. In one example, inter-agglomerate ionomer is varied to form a catalyst layer between about 5 and about 15 microns. In another example, the desired ionomer to catalyst weight ratio is between about 0.5 and about 1.1, where the ionomer weight is the weight of all ionomers of the catalyst layer and total weight is the total weight of the catalyst layer. In a further example, the ionomer to catalyst weight ratio is between about 0.6 and about 0.8. Additionally, the weight ratio of agglomerate ionomer 36 to inter-agglomerate ionomer 38 may be not equal. For example, the agglomerate ionomer to catalyst weight ratio is between about 0.3 and 0.5.

Method 42 enables cathode CL 18 to have a mixed-ionomer structure. In cathode CL 18, agglomerate ionomer 36, which is closest to catalyst particles 34 is different than inter-agglomerate ionomer 38. This enables agglomerate ionomer 36 to be tailored to reduce losses occurring on a small length scale and inter-agglomerate ionomer 38 to be tailored to reduce losses occurring on the length scale of the thickness of catalyst layer 18. As discussed above, in one example, agglomerate ionomer 36 can be a PFSA ionomer and inter-agglomerate ionomer 38 can be a hydrocarbon ionomer. In another example, inter-agglomerate ionomer 38 can be a low EW ionomer and agglomerate ionomer 36 can be a high EW ionomer. In a further example, inter-agglomerate ionomer 38 can have a higher EW or a lower EW than agglomerate ionomer 36.

Method 42 also enables the ratio of agglomerate ionomer 36 to inter-agglomerate ionomer 38 to be adjusted by varying the amount of catalyst particles (i.e., carbon-supported platinum particles) to ionomer in process 44. In method 42, the composition or EW of agglomerate ionomer 36 and inter-agglomerate ionomer 38 is constant along the thickness. However, the EW or composition of inter-agglomeration ionomer 38 or agglomeration ionomer 36 may vary across the thickness of cathode CL 18.

Figure 3:
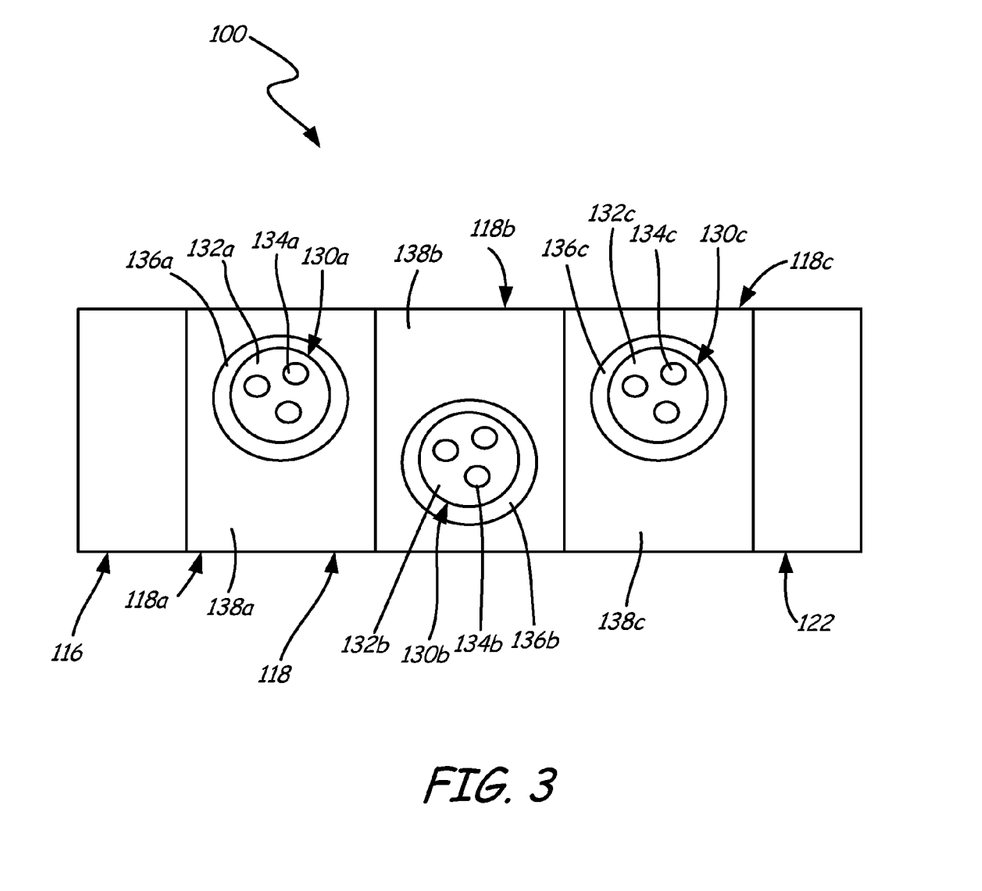
FIG. 3 is an enlarged schematic view of a mixed-ionomer cathode catalyst layer having an equivalent weight or composition gradient along a horizontal axis.

FIG. 3 is a schematic of fuel cell repeat unit 100 having a gradient along the horizontal axis. The gradient can be an EW gradient or a composition gradient, and the gradient can be in agglomerate ionomer 36 and/or inter-agglomerate ionomer 38. FIG. 3 is not to scale and portions of FIG. 3 have been exaggerated to illustrate the details of fuel cell repeat unit 100. Fuel cell repeat unit 100 includes membrane 116, cathode CL 118 (having first layer 118a, second layer 118b and third layer 118c), and cathode GDL 122. The anode side of fuel cell repeat unit 100 is not shown.

As illustrated, cathode CL 118 can be formed of a plurality of discrete layers: first layer 118a includes agglomerates 130a having catalyst support 132a and catalyst particles 134a, agglomerate ionomer 136a and inter-agglomerate ionomer 138a; second layer 118b includes agglomerates 130b having catalyst support 132b and catalyst particles 134b, agglomerate ionomer 136b and inter-agglomerate ionomer 138b; and third layer 118c includes agglomerates 130c having catalyst support 132c and catalyst particles 134c, agglomerate ionomer 136c and inter-agglomerate ionomer 138c.

Within a specific discrete layer of cathode CL 118, agglomerate ionomer 136 has a different EW or composition than inter-agglomerate ionomer 138, or proportions of agglomerate ionomer 136 and inter-agglomerate ionomer 138 may differ. For example, in first layer 118a, agglomerate ionomer 136a may have a different EW or composition than inter-agglomerate ionomer 138a. That is, agglomerate ionomer 136 and inter-agglomerate ionomer 138 of the same discrete layer of cathode CL 118 are different.

Further, agglomerate ionomer 136 of each discrete layer 118a, 118b, 118c of cathode CL 118 can be different from one another, such as having different EWs or compositions. As described further below, agglomerate ionomers 136a, 136b and 136c can form a gradient along the horizontal axis of cathode CL 118, where the horizontal axis extends between membrane 116 and cathode GDL 122. Inter-agglomerate ionomer 138 can vary between discrete layers of cathode CL 118 in a similar manner.

In a first example, inter-agglomerate ionomers 138a, 138b and 138c have different EWs. For example, inter-agglomerate ionomer 138a can be a lower EW ionomer than inter-agglomerate ionomer 138b which is a lower EW ionomer than inter-agglomerate ionomer 138c such that cathode CL 118 has an EW inter-agglomerate ionomer gradient along the horizontal axis. In this example, the EW of inter-agglomerate ionomer 138 increases along the thickness of cathode CL 118 (i.e., the horizontal axis) with increasing distance from membrane 116. This example configuration is beneficial because during operation the flux rate of protons is higher near membrane 116 and decreases along the horizontal axis due to consumption in the fuel-cell reaction. Therefore, improved ionic conductivity in cathode CL 118 is beneficial near membrane 116 and improved oxygen transport is beneficial near cathode GDL 122. Alternatively, inter-agglomerate ionomer 138 can have a composition gradient along the horizontal axis.

In a second example, agglomerate ionomers 136a, 136b and 136c are different. For example, agglomerate ionomer 136a can be a higher EW ionomer than agglomerate ionomer 136b which is a higher EW ionomer than agglomerate ionomer 136c such that cathode CL 118 has an EW agglomerate ionomer gradient along the horizontal axis. In this example, the EW of agglomerate ionomer 136 decreases along the thickness of cathode CL 118 (i.e., the horizontal axis) with increasing distance from membrane 116. This example configuration is beneficial because during operation the oxygen concentration near membrane 116 is lower than the oxygen concentration near cathode GDL 122 and, therefore, higher EW agglomerate ionomer 136 with higher oxygen permeability (especially under dry conditions) is preferable near membrane 116. Alternatively, agglomerate ionomer 136 can have a composition gradient along the horizontal axis.

Figure 4:
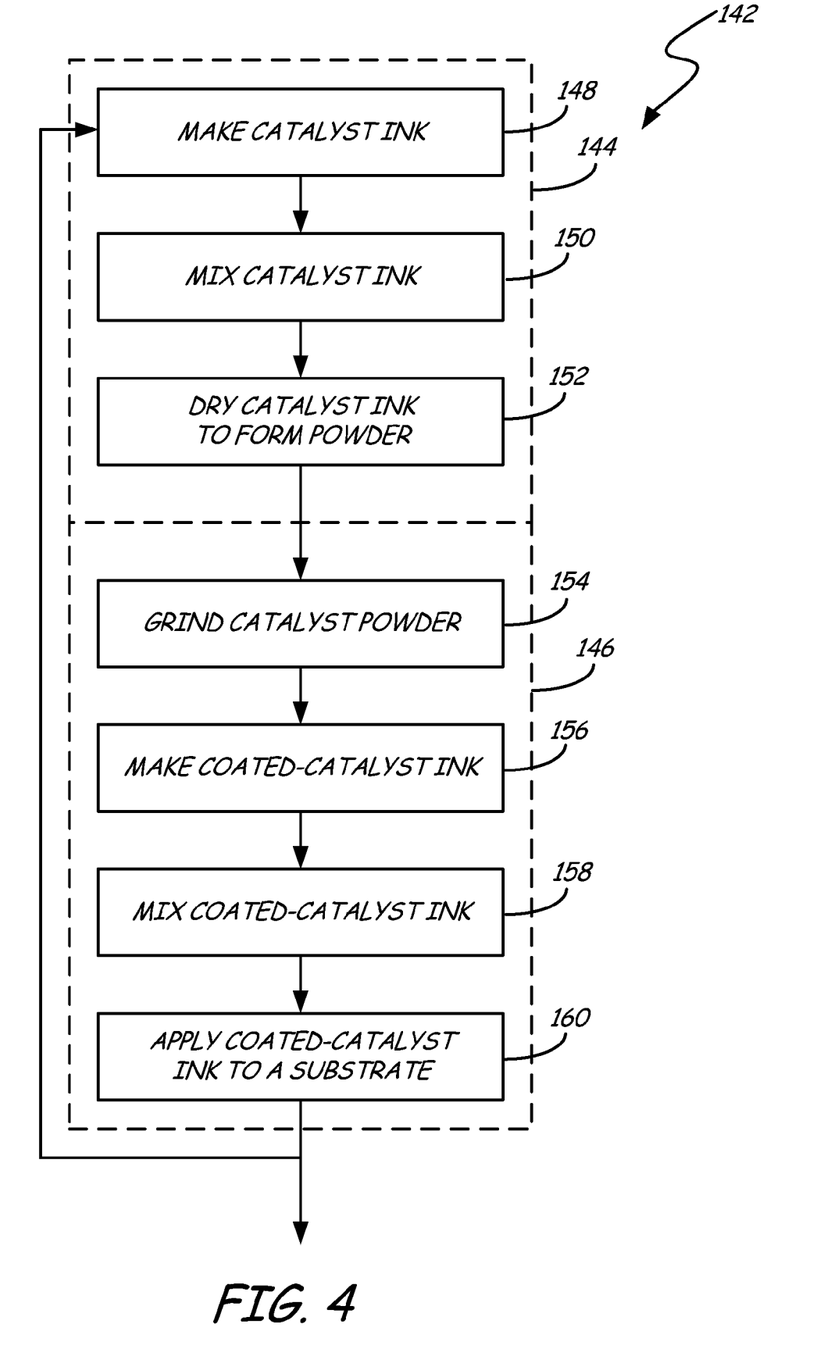
FIG. 4 illustrates a method for forming the mixed-ionomer catalyst layer of FIG. 3 having an equivalent weight or composition gradient along the horizontal axis.

Cathode CL 118 having a gradient in inter-agglomerate ionomer 138 or agglomerate ionomer 136 is formed according to method 142 of FIG. 4. Method 142 is similar to method 42, except processes 144 and 146 are repeated after applying the coated-catalyst ink to a substrate. For example, a first cathode CL is formed by making a catalyst ink (step 148) with catalyst particles and a first agglomerate ionomer. The catalyst ink is mixed (step 150) and dried (step 152). In one example, the agglomerate ionomer is varied to create an agglomerate film between about 1 to about 15 nanometers thick. In another example, the agglomerate ionomer is varied to create an agglomerate film between 2 to about 10 nanometers thick on a 1:1 Pt/C carbon-supported catalyst. The catalyst powder containing catalyst particles coated with the first agglomerate ionomer is ground (step 154) and added to a coated-catalyst ink containing a first inter-agglomerate ionomer (step 156). This coated-catalyst ink is mixed (158) and applied to a substrate or membrane (step 160) to form a first catalyst layer.

The process is then repeated to form a second catalyst layer. That is, a second catalyst ink is formed by mixing a second agglomerate ionomer with second catalyst particles (step 148). The second catalyst ink is mixed (step 150), dried (step 152) and ground (step 154). In step 156, a second coated-catalyst ink is formed by mixing the coated-catalyst powder of step 154 with a second inter-agglomerate ionomer. The second coated-catalyst ink is mixed (step 158) and applied to the substrate on top of the first catalyst layer (step 160). The ionomer (including agglomerate ionomer and inter-agglomerate ionomer) to catalyst weight ratio of each catalyst ink can be varied to control the weight ratio of ionomer to total weight of the cathode catalyst layer. In one example, the ionomer to catalyst weight ratio of the cathode catalyst layer is between about 0.5 and about 1.1. In another example, the ionomer to catalyst weight ratio of the cathode catalyst layer is between about 0.6 and 0.8 for a low loading electrode. The weight ratio of agglomerate ionomer 136 to inter-agglomerate ionomer 138 may be not equal. In another example, the amount of inter-agglomerate ionomer can be varied to create a cathode catalyst layer having a thickness between about 5 and about 15 microns.

The method of forming the cathode CL 118 on membrane 116 affects the order in which the cathode layers are formed. For example, when cathode CL 118 is formed using a decal transfer method, the last catalyst layer formed is adjacent membrane 116, while when a spray method is used, the last catalyst layer formed is adjacent cathode GDL 122.

To form gradients in cathode CL 118, first and second inter-agglomerate ionomers or first and second agglomerate ionomers are different along the horizontal axis of cathode CL 118. More specifically, to form cathode CL 118 having an inter-agglomerate gradient in the thickness direction of cathode CL 118 (i.e., along the horizontal axis), first and second catalyst particles and agglomerate ionomers are the same, and first and second inter-agglomerate ionomers are different. To form cathode CL 118 having an agglomerate gradient in the thickness direction of cathode CL 118 (i.e., along the horizontal axis), first and second catalyst particles and inter-agglomerate ionomers are the same and first and second agglomerate ionomers are different.

Further, method 142 can be used to form cathode CL 118 having a varying weight ratio of agglomerate ionomer to inter-agglomerate ionomer along the thickness of cathode CL 118. Such a cathode CL 118 can be formed by adjusting the amount of inter-agglomerate ionomer added in step 156 for each catalyst layer 118a, 118b, 118c.

Figure 5:
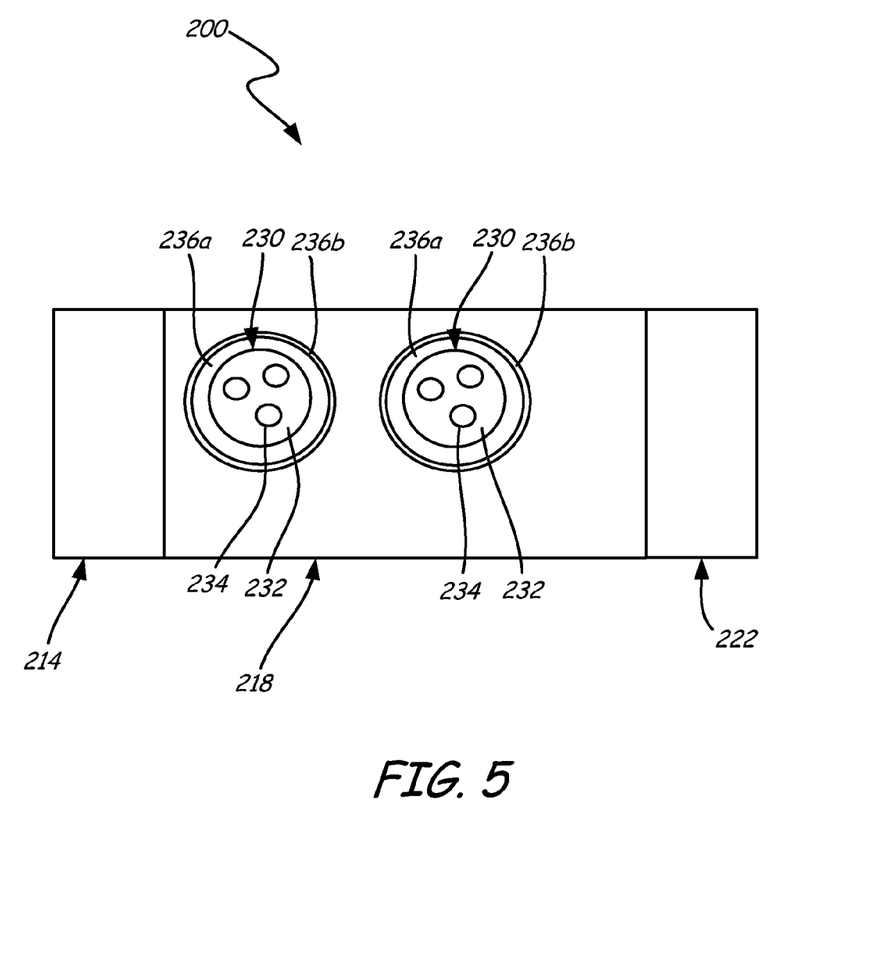
FIG. 5 is an enlarged schematic view of a mixed-ionomer cathode catalyst layer having an equivalent weight or composition gradient in a radial direction surrounding an agglomerate.

As shown in FIG. 5, agglomerate ionomer 236 can have a gradient in the radial direction from the center of agglomerate 230 (i.e., in the thickness direction of agglomerate ionomer 236). In FIG. 5, agglomerate ionomer 236 includes first agglomerate ionomer 236a and second agglomerate ionomer 236b. First agglomerate ionomer 236a is adjacent catalyst support 232 and catalyst particles 234; second agglomerate ionomer 236b is adjacent first agglomerate ionomer 236a and inter-agglomerate ionomer 238. In one example, first agglomerate ionomer 236a and second agglomerate ionomer 236b have different compositions. In another example, first agglomerate ionomer 236a and second agglomerate ionomer 236b have different EWs. Additionally, agglomerate ionomers 236a and 236b can be different than inter-agglomerate ionomer 238.

Figure 6:
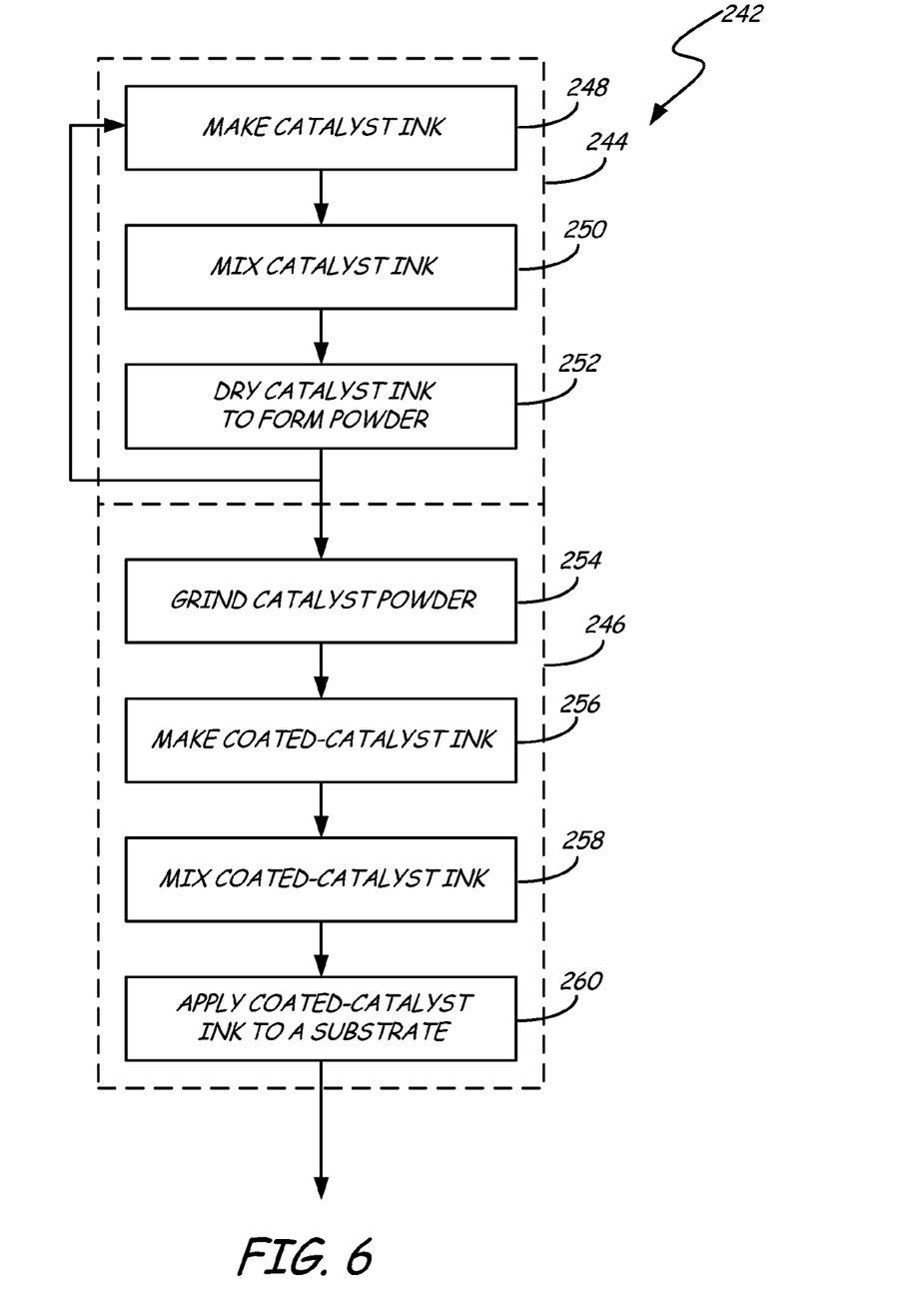
FIG. 6 illustrates a method of forming the mixed-ionomer cathode catalyst layer of FIG. 5.

Agglomerate ionomer 236 having a gradient in the radial direction can be formed according to method 242 of FIG. 6. Method 242 is similar to method 42 of FIG. 2 except process 244 is repeated to form a plurality of layers of agglomerate ionomer on the catalyst particles before forming the coated-catalyst ink. For example, a first catalyst ink is formed in step 248 by mixing catalyst particles with a first agglomerate ionomer. The first catalyst ink is mixed (step 250) and dried (step 252).

The process of making ionomer-coated agglomerates (step 244) is then repeated using the catalyst powder formed in step 252. The catalyst powder of step 252 is added to a second agglomerate ionomer to form a catalyst ink (step 248), which is mixed (step 250) and dried (step 252). The resulting powder contains catalyst agglomerates with two agglomerate ionomer films. In one example, the catalyst agglomerates are 1:1 Pt/C catalysts with the two agglomerate ionomer films combined having a thickness of between about 1 to about 15 nanometers. In another example, the catalyst agglomerates are 1:1 Pt/C catalysts with the two agglomerate ionomer films combined having a thickness of between about 2 to about 10 nanometers.

The dried powder containing agglomerates with two agglomerate ionomer layers is then ground (step 254) and added to a first inter-agglomerate ionomer to form a first coated-catalyst ink (step 256). The first coated-catalyst ink is mixed (step 258) and applied to a substrate (step 260) to form a cathode CL. The ionomer at each catalyst ink step can be varied to control the ionomer to total weight ratio of the cathode catalyst layer, and the weight ratio of agglomerate ionomer 236 to inter-agglomerate ionomer 238 may be not equal. In one example, the agglomerate ionomer to catalyst ratio is between about 0.3 and 0.5, and the ionomer (including agglomerate and inter-agglomerate) to catalyst weight ratio is between about 0.5 and 1.1. In another example that is favorable at low catalyst loadings, the ionomer to catalyst weight ratio is between about 0.6 and 0.8. Additionally, the amount of inter-agglomerate ionomer can be varied to control the thickness of the cathode catalyst layer. For example, the total thickness of the cathode catalyst layer can be between about 5 and about 15 microns.

Method 242 enables a plurality of thin agglomerate ionomer films or layers to be formed on the agglomerates. This enables the agglomerate ionomer composition and/or EW to be varied with radial position. Although the term radial has been used above, the agglomerates may not be spherical. The term radial is used to indicate the direction of thickness of the agglomerate ionomer.

Forming cathode CL 18, 118, 218 according to method 42, 142, 242, respectively, provides a mixed-ionomer electrode. Cathode CL 18, 118, 218 contains agglomerates 30, 130, 230 surrounded by a film of agglomerate ionomer 36, 136, 236 and an inter-agglomerate ionomer 38, 138, 238 between the agglomerate ionomer coated agglomerates. Cathode CL 18, 118, 218 is formed of one or more discrete layers. Within a discrete layer, agglomerate ionomer 36, 136, 236 is a different ionomer than inter-agglomerate ionomer 38, 138, 238. For example, within a discrete layer, agglomerate ionomer 36, 136, 236 has a different composition or EW than inter-agglomerate ionomer 38, 138, 238. Methods 42, 142, 242 also enable the ratio of ionomer content in the agglomerate and inter-agglomerate regions to also be controlled.

Where cathode CL 118 is formed of a plurality of discrete catalyst layers, agglomerate ionomer 136 and inter-agglomerate ionomer 138 of the same discrete catalyst layer have a different composition and/or EW. As discussed above, cathode CL 118, 218 can have a gradient of inter-agglomerate ionomer EW or composition across the thickness of cathode CL 118, a gradient of agglomerate ionomer EW or composition across the thickness of cathode CL 118, a gradient of agglomerate ionomer EW or composition across the thickness of agglomerate ionomer 236, a varying agglomerate ionomer to inter-agglomerate ionomer weight ratio across the thickness of cathode CL 118 or a combination thereof.

Cathode CL 18, 118, 218 enables a low catalyst loading electrode to be formed (i.e., less than about 0.1 mg platinum per square centimeter of electrode). Cathode CL 18, 118, 218 is tailored to reduce over-potential losses specific to low catalyst loading electrodes. For example, agglomerate ionomer 36, 136, 236 and inter-agglomerate ionomer 38, 138, 238 are varied to reduce transport losses and increase fuel cell performance.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A membrane electrode assembly comprising:
   a membrane;
   an anode catalyst layer on a first side of the membrane; and
   a cathode catalyst layer on a second side of the membrane, the first side opposite the second side of the membrane along a first axis, the cathode catalyst layer comprising:
   a plurality of agglomerates, each of the plurality of agglomerates comprising at least one catalyst support supporting catalyst particles, and wherein each of at least some of the plurality of agglomerates comprise a plurality of catalyst supports supporting catalyst particles;
   an agglomerate ionomer surrounding and being in direct contact with each agglomerate; and
   an inter-agglomerate ionomer provided in regions between the agglomerates and in contact with the agglomerate ionomer surrounding the agglomerates such that the inter-agglomerate ionomer supports the agglomerate ionomer covered agglomerates in a dispersed manner throughout the cathode catalyst layer, wherein the agglomerate ionomer is different than the inter-agglomerate ionomer.

2. The membrane electrode assembly of claim 1, wherein the agglomerate ionomer has a different composition than the inter-agglomerate ionomer.

3. The membrane electrode assembly of claim 1, wherein the agglomerate ionomer has a different equivalent weight than the inter-agglomerate.

4. The membrane electrode assembly of claim 1, wherein the composition or equivalent weight of the agglomerate ionomer varies along the first axis.

5. The membrane electrode assembly of claim 1, wherein the composition or equivalent weight of the inter-agglomerate ionomer varies along the first axis.

6. The membrane electrode assembly of claim 1, wherein the catalyst support includes carbon and the catalyst particles include platinum or an alloy of platinum.

7. The membrane electrode assembly of claim 1, wherein the agglomerate ionomer is a perfluorosulfonic acid (PFSA) ionomer and the inter-agglomerate ionomer is a hydrocarbon ionomer.

8. The membrane electrode assembly of claim 1, wherein the inter-agglomerate ionomer has a lower equivalent weight than the agglomerate ionomer.

9. The membrane electrode assembly of claim 1, wherein the inter-agglomerate ionomer has a higher equivalent weight than the agglomerate ionomer.

10. The membrane electrode assembly of claim 1, wherein the equivalent weight or the composition of the agglomerate ionomer surrounding one of the agglomerates varies in a radial direction from the center of the agglomerate.

11. A membrane electrode assembly for use in a fuel cell, the membrane electrode assembly including:
a membrane; and
a catalyst layer adjacent to the membrane, the catalyst layer comprising:
  a plurality of agglomerates, each of the plurality of agglomerates comprising at least one catalyst support supporting catalyst particles, and wherein each of at least some of the plurality of agglomerates comprise a plurality of catalyst supports supporting catalyst particles;
  a first ionomer film surrounding and being in direct contact with each agglomerate such that the catalyst particles supported by the one or more catalyst supports of each agglomerate are surrounded by the first ionomer film; and
  a second ionomer provided in regions between the agglomerates comprising the catalyst particles surrounded by the first ionomer film such that the second ionomer supports the first ionomer film covered agglomerates in a dispersed manner throughout the catalyst layer, wherein the first ionomer and the second ionomer have different compositions or equivalent weights.

12. The membrane electrode assembly of claim 11, wherein the first ionomer is a PFSA ionomer and the second ionomer is a hydrocarbon ionomer.

13. The membrane electrode assembly of claim 11, wherein the first ionomer has a different equivalent weight than the second ionomer.

14. The membrane electrode assembly of claim 11, wherein the second ionomer has an equivalent weight gradient in which the equivalent weight of the second ionomer changes with increasing distance from the membrane.

15. The membrane electrode assembly of claim 11, wherein the first ionomer has an equivalent weight gradient in which the equivalent weight of the first ionomer changes with increasing distance from the membrane.

* * * * *